Dec. 5, 1933.                F. P. MADDEN                1,937,972
                       FLY ROD, FISH LINE GUIDE
                         Filed Feb. 11, 1933
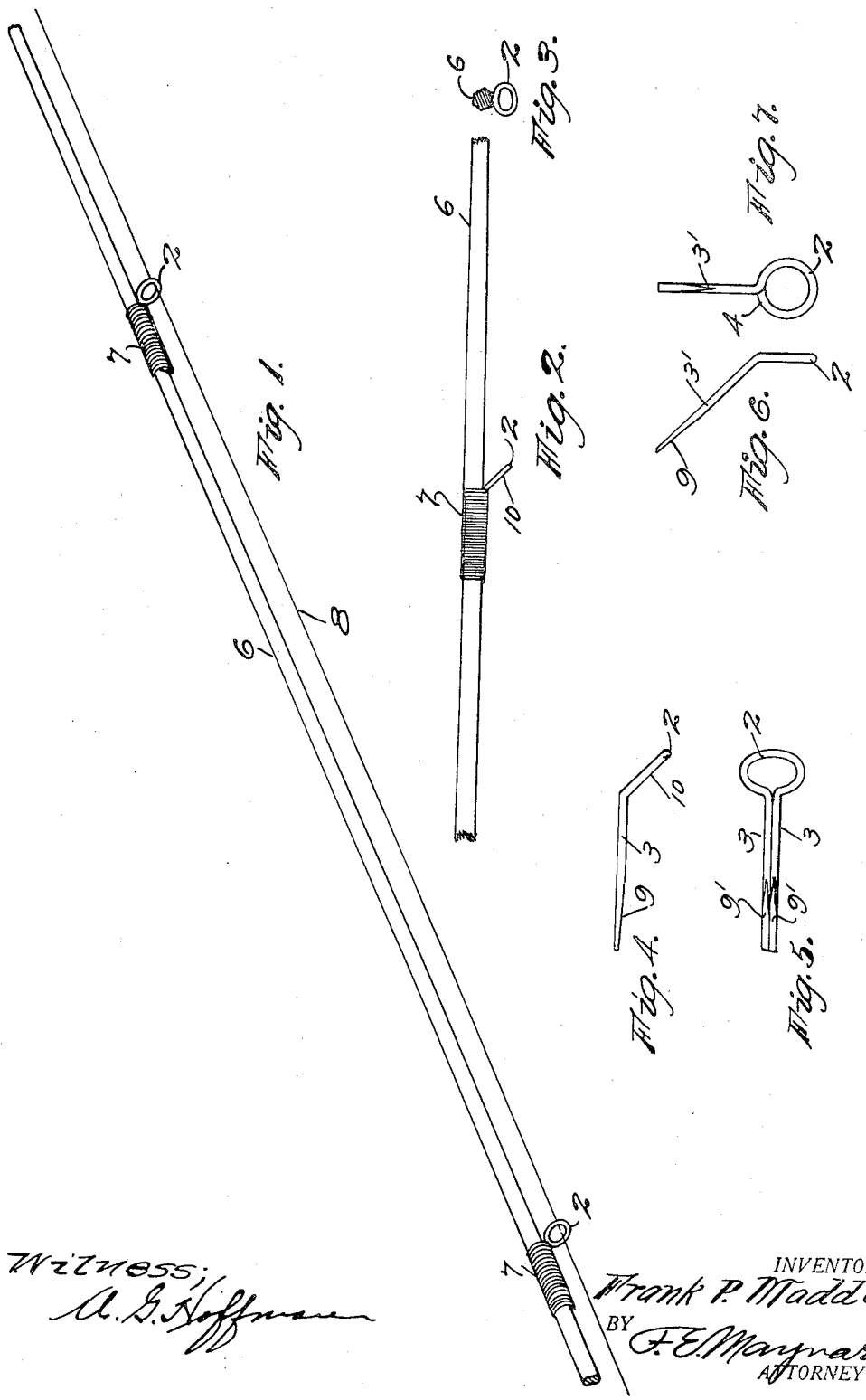

Patented Dec. 5, 1933

1,937,972

UNITED STATES PATENT OFFICE 1,937,972

FLY ROD, FISH-LINE GUIDE

Frank P. Madden, Los Angeles, Calif.

Application February 11, 1933. Serial No. 656,302

2 Claims. (Cl. 43—24)

This invention relates to fish-line guides for fly rods.

The sport of fishing as currently practiced in fishing trout streams is done with a remarkably light bamboo rod. Some weigh as little as three ounces and fish as heavy as fifteen pounds are netted by competent fishermen. This art is more commonly called "fly casting" and because of the flexibility of the delicate rod and due to conventional form of line guides secured along the rod it not infrequently happens that the line will entangle at one or more of the eyes forming the guides.

An old and well known form of guide is called the "snake" guide because of its peculiar helical loop. These have coaxial oppositely directed shanks from the axially spaced ends of the helical loop. When a line runs out on the rod two possible obstructions are presented by the spaced ends of the snake loop; more especially the remote end. This hazard of tangling is very objectionable.

It is therefore an object of the present invention to provide a form of eye or guide which practically entirely eliminates the chance of fouling the line at the guide, and to provide a guide of simple, single ring form and whose limb is uniplane; that is, the guide eye lies in one plane. Further, to facilitate out-run of the line the guide eye is disposed at an oblique angle, and slants away from the grip end of the rod so that acute angles are eliminated on the near side of the guide.

A further object is to provide for the effective securement of the guide in situ on a flat facet such as is found on hexagonal section rods; especially of the smallest dimension.

And an object is to provide a guide of great strength and low weight.

In the drawing:

Figure 1 is a perspective of a portion of a rod section with applied guides.

Figure 2 is a side elevation of a portion of a rod section with a guide.

Figure 3 is a cross section of a rod with the guide in face view.

Figure 4 is a side elevation of a double shank guide, and

Figure 5 is a bottom plan thereof.

Figure 6 is a side elevation, and

Figure 7 is a face view of a single shank form of the guide.

It is found that in the "snake" form of guide there is presented a plurality of spaced shoulders where the guide laps on the rod, and one of these shoulders forms an acute angle or crotch toward the grip end of the rod. When the line pays out it often whips around the crotch shoulder and binds.

The guide of the present invention comprises a single ring body 2 from one side of which extends radial shanks 3—3, Fig. 5, though a variant type is shown in Fig. 7 as having only one shank 3'. In the latter type the wire of which the device is made has one end 4 rigidly affixed in any suitable manner, as welding, to the bend at the base of the shank 3'.

In the type of Fig. 5 the wire shanks are set close together thus forming a wider base than is available with the single wire shank. The advantage of this is that when the guide is placed on one of the narrow side facets of a hexagonal rod 6 and tied down by a silk or other thread 7 the shank takes a flat base position and is stable under side thrust of the line 8.

In order to reduce line run resistance the ends of the shank 3 and 3' are beveled off at 9 towards their ends so that the wrapping 7 will form a gradual rise from the rod face up onto the full-size shank part and at the same time not sacrifice the stability of the guide. Indeed, the flattening effected by the beveling increases the holding effort of the wrapping because of the wide flat area 9' of the beveled part.

To eliminate any acute crotch forming angles toward the grip end it will be noted that the guide eye or ring is disposed at an angle of about 45° to the guide axis and thus lies at an obtuse angle of about 135° in the direction of line run.

Any whipping sidewise will immediately cause the line to strike the obtusely oblique face 10 and this will guide the line down and away from the basal part of the ring near the rod.

This oblique arrangement of the eye or ring 2 affords the use of a relatively large diameter guide giving ample runway without unduly increasing the packing dimension of the collapsed rod sections. In other words a quarter-inch ring may be employed without requirement of a lateral projection of the same dimension from the rod.

Manifestly the guide may be made of any suitable material and in any suitable manner.

In addition to the advantages above stated it is found that by use of a rod with this form of guide a far more accurate cast is possible with a twenty-five per cent increase in length of cast. This is due to the large loop passage and the close setting of the loops to the rod.

What is claimed is:

1. A fish line guide of wire and having a guide ring from one side of which the wire extends in side-by-side shanks the guide ring lying at an obtuse angle to the axis of the shank.

2. A fish line guide of wire and having a guide ring from one side of which the wire extends in side-by-side shanks.

FRANK P. MADDEN.